CAVITY AMPLIFIER WITH ANNULAR GRID CAVITY

Filed Nov. 13, 1961 2 Sheets-Sheet 1

INVENTOR.
GERHARD W. BRAUER
BY
Beehler & Shanahan
ATTORNEYS

CAVITY AMPLIFIER WITH ANNULAR GRID CAVITY

Filed Nov. 13, 1961 2 Sheets-Sheet 2

INVENTOR.
GERHARD W. BRAUER
BY
Beehler & Shanahan
ATTORNEYS

United States Patent Office 3,122,712
Patented Feb. 25, 1964

3,122,712

CAVITY AMPLIFIER WITH ANNULAR GRID CAVITY

Gerhard W. Brauer, Los Angeles, Calif., assignor to Resdel Engineering Corporation, Pasadena, Calif., a corporation of California Filed Nov. 13, 1961, Ser. No. 151,605
7 Claims. (Cl. 330—56)

This invention relates to cavity amplifiers employing electron tubes of axial structure, such as pencil and lighthouse tubes. In such cavity amplifiers, the tunable circuit elements are external to the tube proper, in contrast with klystron and traveling wave tubes which contain these tuning elements within the tube enclosure, and which are intended for higher frequencies and shorter wave lengths than the band between 500 and 5000 megacycles per second, with which the present invention is concerned.

More particularly, the present invention is concerned with a cavity amplifier in which an annular cavity encircles the grid element and coacts with the capacitance in the grid circuit to provide a circuit having a resonant frequency much lower than the intended operating frequency of the cavity amplifier. This feature inhibits unwanted feedback between output and input circuits, in the types of circuits most commonly employed with such cavity amplifiers.

In its preferred form, the annular grid cavity is contained within a relatively massive heat-dissipating wall structure, which has large surface areas in thermal contact with both the tube and heat-dissipating electronic circuit elements.

It will be understood that this invention is not limited to amplifiers only, and that the term "cavity amplifier" is used herein for convenience to include not only cavity amplifiers but oscillators, mixers, frequency multipliers, and other devices in which a tube of the pencil or lighthouse type is mounted in a housing enclosing a tank circuit cavity.

Cavity amplifiers and similar devices are employed extensively for missile tracking and control, airplane traffic control, and other telemetering applications. Many, and perhaps most, applications of cavity amplifiers are in equipment operating under severe environmental conditions, such as extreme temperatures, high shock and acceleration, and prolonged vibration. At the same time, conservation of weight and space in missiles and the like dictates a general trend toward miniaturization, so that large weight and size cannot be utilized in order to achieve strength and safe temperature levels.

It is especially necessary to protect the tube and its elements from excessive temperatures; for example, the tube seals are vulnerable to excvessive heat, and must be *provided* with efficient heat transfer means for safe dissipation of heat despite the miniature size of the cavity device.

Not only is good heat transfer important to achieve high service life and reliability but also electrical stability, mainly with respect to tuning. At higher frequencies relatively small variations in tube capacity cause large variations of center frequency of operation, in other words, detuning and loss of output power. Poor heat transfer from the anode with consequent high temperature of tube electrodes and tube envelope inevitably results in variation of the particularly critical tube output capacity. Under critical conditions a thermal runaway may occur. Detuning of the tank circuit as a result of heating, produces an increase in plate dissipation, which, in turn, further increases tube temperature and output capacity variation, resulting in further reduced output capacity, resulting in further reduced output power, until, finally, nearly the total R.F. power is no longer delivered into the load but dissipated in the tube, resulting in tube damage or destruction.

In the past, cavity amplifier designs have met the challenge of miniaturization with a bewildering profusion of shapes and sizes. Devices have generally been of different shape, size, and weight for each power gain, power output, and frequency of operation; a shaft in any one of the three principal determinants of the physical exterior of the cavity device has generally required a change in mechanical parts and in the mounting structure within the missile or airplane.

In many of the cavity amplifiers operating in the frequency range for which the present invention is intended, undesirable feedback and instability of operation have been difficult to avoid. It is desirable to mount the tube in its mounting wall structure by means of the annular metal flange of the grid. The best heat transfer is achieved by using a maximum surface area of mounting for the flange. In the past, mounting the grid with extended surface contact for mechanical and thermal reasons has been accompanied by undesirable feedback from the output to the input circuit.

In many cavity devices, the only circuit providing stable, non-regenerative operation, without neutralization circuits, is the grounded grid amplifier. The unwanted feedback then occurs directly through the grid mounting.

In other applications, a D.C.-isolated grid is required. This can be accomplished by means of isolating capacitors in the form of micra ring-shaped insulating gaskets between each side of the grid flange and the metal mounting wall structure. In order to keep the thermal barrier at a minimum, it is desirable that the mica sheets be extended in area and very thin. Unfortunately, this requirement conflicts with electronic requirements, since the isolating capacitance produces an unwanted feedback path between output and input circuits.

The foregoing and many other disadvantages of the prior art of cavity amplifiers have been met and overcome by the structure of the present invention, by virtue of utilization of an annular cavity encircling the grid flanges by means of which the tube is mounted. The annular cavity makes it practical to use the same size of miniature housing, for a given power, for almost any wave length within the band which is the subject of the invention. The cavity functions as an inductance loop, which helps to decouple the input and output circuits from each other. Where size limitations on the housing require the use of a relatively small annular cavity, its inductance may be increased to the required amount by means of core of ferrite or similar paramagnetic material.

Many cavity amplifiers heretofore known, particularly those of the compact type of the present invention, have been subject to an undesirable tendency to operate at a ¾ wave mode instead of the intended ¼ wave mode for which the tank circuit cavity was designed.

The present invention includes in its preferred species, a means of suppression such undesired ¾ mode standing waves. A slab of ferrite or other lossy material is fastened to the cavity wall near the location of maximum current flow for a ¾ mode standing wave. At this point the magnetic field is at a maximum, exciting a strong magnetic field in the ferrite slab. Hysteresis losses in the ferrite slab for the ¾ wave mode tend to dampen any tendency of the amplifier to oscillate at the corresponding frequency, without appreciably dampening operation of the amplifier at the desired, fundamental ¼ wave mode, since for the ¼ wave mode, the ferrite body is not near the maximum of the magnetic field. Moreover, magnetic losses in different ferrite materials are at a maximum at different frequencies, consequently, it is possible to enhance the attenuation of the undesired ¾ wave mode by selecting a ferrite material which shows a loss characteristic strongly increasing with frequency, so that the high frequency corresponding to the ¾ wave mode can be vigorously attenuated with only insignificant losses at the fundamental ¼ wave mode. An auxiliary advantage of this device is attenuation of harmonics generated in the tube, in particular under Class C operating conditions. This species of the invention is not only useful in amplifiers, but also in oscillators, frequency converters (mixers, multipliers, etc.). By this means the present invention avoids the undesired parasitic mode operations which tend to occur in devices employing reentrant type cavities, which, by their very nature exhibit resonances within a wide range of frequencies.

The cavity amplifier of the present invention may be embodied in a device employing any of the high frequency electron tubes of co-axial structure, including triodes, tetrodes, and pentrodes. For purposes of illustration, and without any implication of restriction thereto, a specific embodiment employing a pencil tube is described in the following specification and illustrated in the accompanying drawings, in which.

Figure 3:
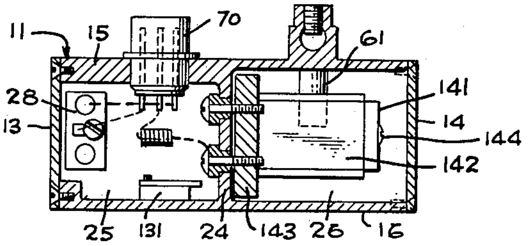
FIGURE 3 is a left side elevational view of the cavity amplifier of FIGURE 2.
Figure 3A:
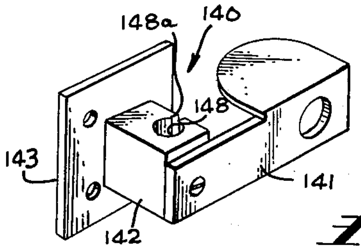

FIGURE 3*a* is a perspective view of the anode circuit.

Figure 2:
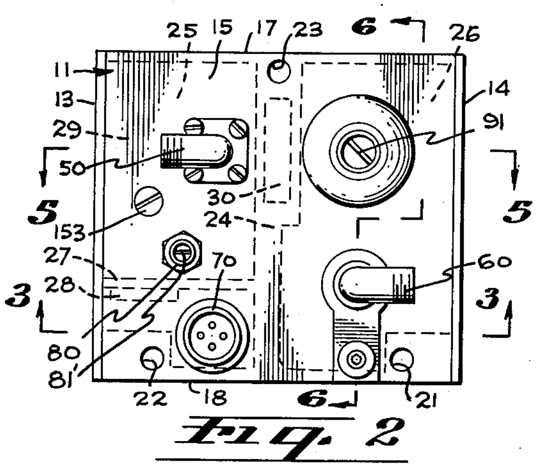
FIGURE 2 is a front elevational view of a cavity amplifier constructed according to the invention and employing a pencil tube.
Figure 4:
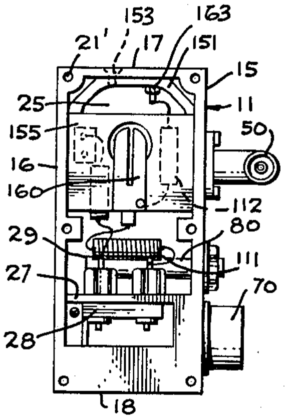
Figure 5:
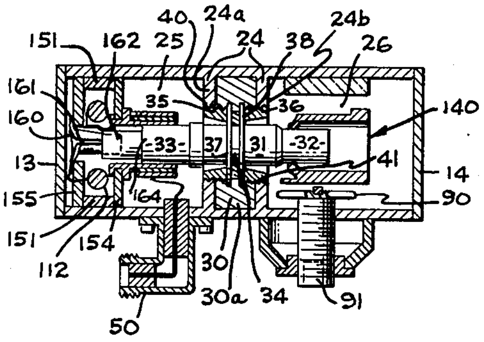

FIGURE 4 is a horizontal sectional view as seen looking upward at the horizontal plane indicated by the numerals 3—3 in FIGURE 2;

FIGURE 5 is a horizontal sectional view as seen looking downwards at the horizontal plane indicated by the number 5—5.

Figure 6:
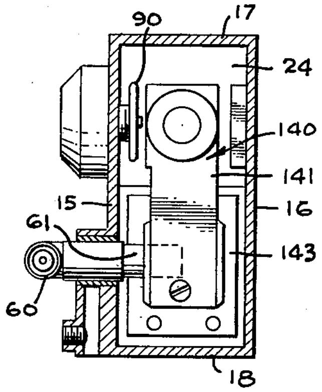
Figure 7:
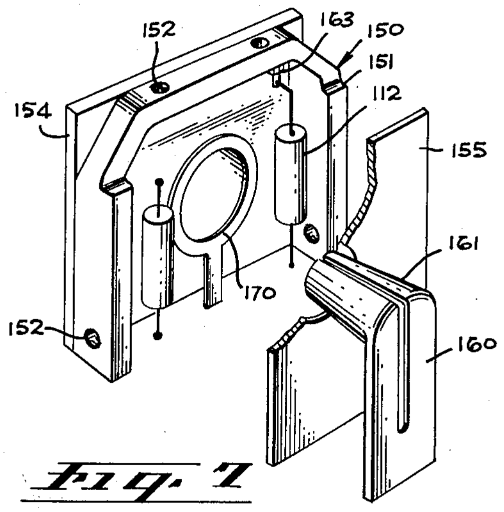

FIGURE 6 is a vertical sectional view as viewed in the direction of the arrows 6—6 along the line indicated between the arrows 6—6 in FIGURE 2; and FIGURE 7 is a perspective view, partially broken away, of the split banana plug connection for the base of the pencil tube of the cavity amplifier of FIGURES 2 to 6.

The circuit of FIGURE 1 will first be described in order that the novel features disclosed by the mechanical construction of FIGURES 2 to 7 may be best understood, although the circuit diagram does not reveal any feature of novelty, and does not depart substantially from the prior art.

Figure 1:
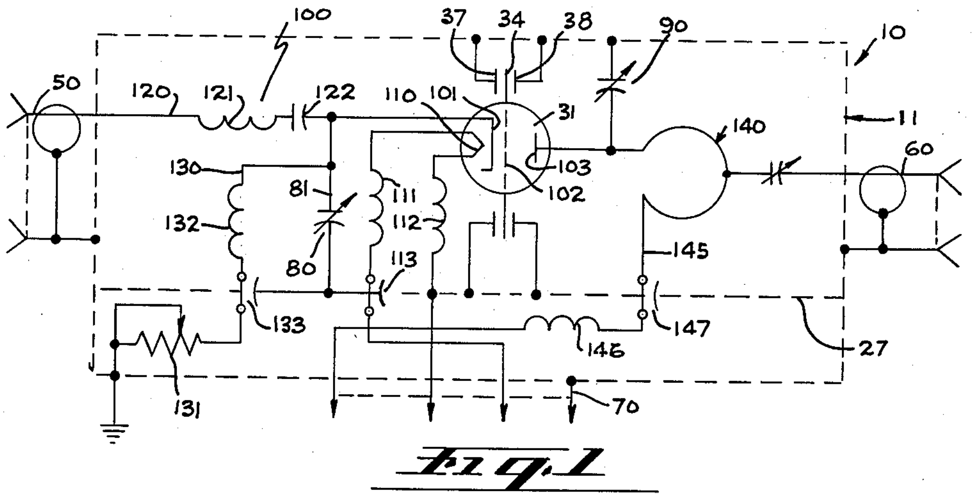
FIGURE 1 is a circuit diagram for the cavity amplifier illustrated in succeeding figures.

Although the invention resides primarily in the mechanical structure, and in the decoupling inductance produced by the mechanical structure, the invention will be best understood by an explanation which refers simultaneously to both the structure as illustrated in FIGURES 2 to 7, and the electronic circuit which it embodies, and which is shown in FIGURE 1.

The circuitry of FIGURE 1 is mostly conventional to cavity amplifiers of the present type, except for the arrangement of the grid by-pass capacitors and the associated annular cavity, which latter provides an inductance for recoupling input from output circuits, as described hereinafter.

The cavity amplifier of the illustration is referred to generally by the numeral 10. Its housing, ordinarily an aluminum casting, provided with certain machined surfaces, and gold plated for the purposes well known in the art of cavity amplifier construction, is a rectangular blocklike structure identified by the numeral 11, and is open at the left and right sides, being covered by mating aluminum side plates 13 and 14.

The housing 11 is indicated in the circuit diagram of FIGURE 1 by the dashed outline to which the lead line of the numeral 11 is connected.

All of the external circuit connections, the mounting attachment means, and the tuning adjustment means, are accessible from the front wall of the housing 11, herein referred to as connection wall 15, and seen in the front elevational view of FIGURE 2.

The left side view of FIGURE 4 is shown with left side plate 13 removed. The back mounting wall 16 is seen as the end view of a plane, suitable for secure mounting on a flat-machined plane mounting surface. Preferably, the top and bottom walls 17 and 18 are sufficiently thick in certain locations, as seen from the dashed lines in FIGURE 2, to accommodate mounting bore holes 21, 22, and 23.

Mounting screws may be inserted from the connection wall side to screw into a mounting surface (not shown).

The side plates 13 and 14 are attached to the sides of housing 11 by means of screws threading into screw holes 21 distributed around the periphery of the side axis openings, and visible in FIGURE 4, for the left side, the right side not being illustrated in side view since it is substantially identical as to side plate mounting. The side plates 13 and 14 may be removed from the housing 11 for assembly, alteration or repair, but are not required to be removed for mounting, connection, or tuning.

The internal partitioning of housing 11 is illustrated in dashed outline in FIGURE 2. A relatively massive tube support wall 24, seen in dashed section in FIGURE 2, in full section in FIGURES 3 and 5, and in left and right side elevations in FIGURES 4 and 6, respectively, extends from the connection wall 15 to the mounting wall 16 and divides the interior of housing 11 into left and right compartments which are designated as circuit section 25 and tank cavity 26, respectively. The circuit section 25 is in turn divided by a horizontal wall 27 into an R.F. filter box 28 and an upper portion which may be referred to as a tube input section 29.

It will be seen from the dashed outline of FIGURE 2, and the sectional view of FIGURE 5, that the tube support wall 24 is hollow in order to provide an inductance cavity 30, which encircles the location of tube mounting, as will be described hereinafter.

The tube support wall 24 is so called because it provides the mounting support for the vacuum tube employed in the cavity amplifier, in this case a pencil tube 31. It will be understood that the invention is broadly suited to tubes of coaxial structure, including both lighthouse and pencil tubes.

The tube 31 is seen in FIGURE 5 to have its anode end 32 projecting to the right into the tank cavity 26, and its cathode end 33 projecting to the left into the circuit section 25.

The grid within tube 31 is integral with an external flange 34, by means of which the tube 31 is supported in tube support wall 24.

The flange 34 is tightly gripped between a pair of externally threaded mounting rings 35 and 36, the rings being insulated from the flange by insulating ring gaskets 37 and 38.

The portions of tube support wall **24*a* and 24*b* to the left and right of the cavity 30 have threaded bores at 40 and 41 to receive the mounting rings 35 and 36**.

The external circuit connection elements are seen physically in FIGURE 2, and by circuit diagram in FIGURE 1. Coaxial input and output lines 50 and 60, respectively, provide connection to the circuit generally indicated by the numeral 100. Power is supplied through four pin connectors 70.

Both input and plate tuning may be accomplished at the front connection wall by means of input tuning capacitor 80 controlled by the screw 81. Plate tuning is accomplished by means of plate tuning capacitor 90 controlled by plate tuning screw 91.

The tube 31 is seen, in FIGURE 1, to be a triode with a cathode 101, grid 102, and anode 103.

The portion of the wiring diagram of FIGURE 1 to the right of the grid 102 corresponds to the portion of the tube 31 projecting into the tank cavity 26, while the portion to the left of the grid 102 corresponds to the components in the tube input chamber 29. The dashed line 27, in FIGURE 1, is the partition wall seen physically in dashed outline in FIGURE 2, and the portion below the partition 21 in the wiring diagram of FIGURE 1, indicates the components to be found in the R.F. filter box 28. The cathode 101 is heated by means of filament 110, which is connected through filament chokes 111 and 112, and filament by-pass capacitor 113 to the power input connector 70.

Cathode input from coaxial input connection 50 is connected to the cathode 101 through cathode line 120, input matching inductance 121, and D.C. isolation capacitor 122. Voltage of the cathode relative to ground is established in the cathode resistance line 130 by adjustable cathode resistor 131, which is connected in series in line 130 with the cathode choke 132. Passage of line 130 through the partition 21 is by way of an annular by-pass condenser 133.

Tuning by input tuning condenser 80 is accomplished by tuning the capacitance between cathode 101 and ground in input tuning line 81.

The anode circuit is a relatively massive physical structure as illustrated in perspective in FIGURE 3*a*, and identified by the numeral 140. It is a massive plate inductor loop comprised of a single quarter turn in the form of the anode connection bar 141, the output connection bar 142, and the mounting plate 143.

The B+ line 145 is provided with a B+ line choke 146 and an annular-type by-pass capacitor 147.

It will be seen from FIGURE 3 that the massive anode circuit structure 140 is braced by the rigid coaxial output conduit member 61, which is closely received in a bore 148, split at 148*a* to admit member 61 with a tight fit.

The input circuitry for the tube 31 is comprised in a mechanical structure which provides substantial bracing for the tube 31. A perspective view of the input circuit structure is shown enlarged and partially broken away, and partially exploded to reveal detail, in FIGURE 7, in which it is indicated generally by the numeral 150. A relatively massive and rigid metal yoke member 151 is snugly received in the housing 11, seen in FIGURE 4, and can be screwed into position by screws which pass through the housing and into screwed bore holes 152, as indicated in FIGURE 4 by screw 153 seen in dashed outline.

The yoke 151 carries on its opposite faces a pair of circuit mounting boards 154 and 155, which are made of any suitable insulating material. The outer board 155 provides mounting for a metal contact member 160, which is provided with a split banana probe contact 161 of resilient structure, for reception into the tubular end 162 of tube 31. This connection provides one of the filament connections, filament choke 112 being seen in FIGURE 7 as grounded to the housing 11 at grounding screw 163.

The inner mounting panel 154 carries a ring-shaped connection member 170, which is connected to the other filament choke 111 (not seen in FIGURE 7) and provides electrical contact with the sleeve 163 which functions as the other filament terminal.

It will be seen from the foregoing description that I have provided a cavity amplifier, of conventional circuitry, but embodied in novel mechanical structure. The circuitry is supplemented by the annular cavity 30 formed between the two portions 24*a* and 24*b* of the tube mounting wall 24, and encircling the tube 31 in the region of its grid flange 34.

In the embodiment illustrated, the annular cavity 30 is shown filled with a lossy material such as a ferrite ring 30*a*.

However, the cavity 30 will, in some designs, provide sufficient inductance to serve its decoupling function without the use of any ring core.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described my invention what is conceived to be new in support of Letters Patent is:

1. A cavity amplifier structure which includes: a metal housing, a tube support wall within said housing, said tube support wall dividing the interior of said housing into a circuit section and a tank circuit cavity shaped to resonate at a design frequency; a tube having a coaxial structure including an external flange for mounting and electrical connection of a tube element, said tube being mounted by means of said flange in said tube support wall with its anode end projecting into said tank circuit cavity, and its cathode end projecting into said circuit section; by-pass capacitance means formed by said flange mounting; walls defining an annular cavity within said tube mounting wall encircling said tube at said external flange, said cavity walls being shaped to form an inductance loop between opposite sides of said mounting flange, said inductance loop forming a circuit with said capacitance means, and said circuit having a resonant frequency low relative to the design frequency of said cavity amplifier; an anode circuit structure extending from the anode end of said tube to said tube support wall in said tank circuit cavity, said anode circuit structure comprising a mounting plate in intimate thermal contact with said tube support wall and a plate connection loop in the form of a rigid structure between said mounting plate and the anode connection of said tube; an input circuit mounting structure comprised of removable metal yoke means encircling the input end of said tube, and closely received in said circuit section of said housing for secure mounting therein; insulating panel structure for the mounting of circuit elements, said insulating panel structure being supported on said yoke at the input end of said tube.

2. A cavity amplifier structure which includes: a metal housing having a mounting wall and a connection wall as exterior walls on opposite sides of said housing; a tube support wall within said housing between said mounting wall and said connection wall, said tube support wall dividing the interior of said housing into a circuit section and a tank circuit cavity shaped to resonate at a design frequency; a tube having a coaxial structure including an external flange for mounting and electrical connection of a tube element, said tube being mounted in said tube support wall by means of said flange, with its anode end projecting into said tank circuit cavity, and its cathode end projecting into said circuit section; walls defining an annular cavity within said tube mounting wall encircling said tube at said external flange, said cavity walls being shaped to form an inductance loop between opposite sides of said mounting flange, said inductance loop forming a series circuit with capacitance at said mounting flange, and said series circuit having a resonant frequency lower than fifty megacycles; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, and a plate connection loop in the form of a rigid structure between said mounting plate and the anode connection of said tube; and rigid electrical connection means between said housing and said tube to brace the ends of said tube on each side of said mounting wall.

3. A cavity amplifier structure which includes: a metal housing having a mounting wall and a connection wall as exterior walls on opposite sides of said housing; a tube support wall within said housing between said mounting wall and said connection wall, said tube support wall dividing the interior of said housing into a circuit section and a tank circuit cavity shaped to resonate at a design frequency; a tube having a coaxial structure including an external flange for mounting and electrical connection of a tube element, said tube being mounted in said tube support wall by means of said flange, with its anode end projecting into said tank circuit cavity, and its cathode end projecting into said circuit section; walls defining an annular cavity within said tube mounting wall encircling said tube at said external flange, said cavity walls being shaped to form an inductance loop between opposite sides of said mounting flange, said inductance loop forming a series circuit with capacitance at said mounting flange, and said series circuit having a resonant frequency lower than fifty megacycles; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, and a plate connection loop in the form of a rigid structure between said mounting plate and the anode connection of said tube; said loop being disposed in said tank circuit cavity in a plane substantially parallel to said connection wall; and an output connection structure comprised of rigid coaxial conduit means mounted in said connection wall and connected to said plate connection loop to form an integral structure therewith and brace said loop in a plane normal to its plane of disposition.

4. A cavity amplifier structure which includes: a metal housing having a mounting wall and a connection wall as exterior walls on opposite sides of said housing; a tube support wall within said housing between said mounting wall and said connection wall, said tube support wall dividing the interior of said housing into a circuit section and a tank circuit cavity shaped to resonate at a design frequency; a tube having a coaxial structure including an external flange for mounting and electrical connection of a tube element, said tube being mounted in said tube support wall by means of said flange, with its anode end projecting into said tank circuit cavity, and its cathode end projecting into said circuit section; walls defining an annular cavity within said tube mounting wall encircling said tube at said external flange, said cavity walls being shaped to form an inductance loop between opposite sides of said mounting flange, said inductance loop forming a series circuit with capacitance at said mounting flange, and said series circuit having a resonant frequency lower than fifty megacycles; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, and a plate connection loop in the form of a rigid structure between said mounting plate and the anode connection of said tube; said loop being disposed in said tank circuit cavity in a plane substantially parallel to said connection wall; an output connection structure comprised of rigid coaxial conduit means mounted in said connection wall and connected to said plate connection loop to form an integral structure therewith and brace said loop in a plane normal to its plane of disposition; an input circuit mounting structure comprised of removable metal yoke means encircling the input end of said tube, and closely received in said circuit section of said housing for secure mounting therein; insulating panel structure for the mounting of circuit elements, said insulating panel structure being supported on said yoke at the input end of said tube; and a mechanically rigid input circuit structure in said insulating panel structure and comprised of longitudinally split cylindrical probe means projecting from said insulating panel structure and received in the input end of said coaxial tube.

5. A cavity amplifier structure which includes: a metal housing comprised of a body open at each side, and a pair of removable side panels, said body having a front connection wall and a back mounting wall; a tube support wall extending from said mounting wall to said connection wall, and dividing the interior of said housing into a circuit, a section and a tank circuit cavity shaped to resonate at a design frequency, said circuit section and said tank cavity being each accessible by removal of one of said side panels; a tube having a coaxial structure including an external flange for mounting and tube connection, said tube being mounted in said tube support wall with its anode end projecting into said tank circuit cavity, and its cathode end projecting into said circuit section; walls defining an annular cavity within said tube mounting wall encircling said tube at said external flange, said cavity walls being shaped to form an inductance loop between opposite sides of said mounting flange, said inductance loop forming a series circuit with capacitance at said mounting flange, and said series circuit having a resonant frequency lower than fifty megacycles; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, by means of which said tube is mounted in said mounting wall, and a plate connection loop in the form of a rigid structure between said mounting plate and the anode connection of said tube, said loop being disposed in said tank circuit cavity in a plane substantially parallel to said connection wall, and said loop having a thermally-conductive cross section not less than the area of connection to said anode; an output connection structure comprised of rigid coaxial conduit means mounted in said connection wall and connected to said plate connection loop to form an integral structure therewith and brace said loop in a plane normal to its plane of disposition; an input circuit mounting structure composed of removable metal yoke means encircling the input end of said tube, and closely received in said circuit section of said housing for secure mounting therein; insulating panel structure for the mounting of circuit elements, said insulating panel structure being supported on said yoke at the input end of said tube; and a mechanically rigid input circuit structure in said insulating panel structure and comprised of longitudinally split cylindrical probe means projecting from said insulating panel structure and received in the input end of said coaxial tube.

6. A cavity amplifier structure which includes: a metal housing comprised of a body open at each side, and a pair of removable side panels, said body having a front connection wall and a back mounting wall; a tube support wall extending from said mounting wall to said connection wall, and dividing the interior of said housing into a circuit, a section and a tank circuit cavity shaped to resonate at a design frequency, said circuit section and said tank cavity being each accessible by removal of one of said side panels; a wall dividing said circuit section into a power filter chamber and an input circuit chamber; a tube having a coaxial structure including an external flange for mounting and tube connection, said tube being mounted in said tube support wall with its anode end projecting into said tank circuit cavity, and its cathode end projecting into said input circuit chamber; walls defining an annular cavity within said tube mounting wall encircling said tube at said external flange, said cavity walls being shaped to form an inductance loop between opposite sides of said mounting flange, said inductance loop forming a series circuit with capacitance at said mounting flange; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, by means of which said tube is mounted in said mounting wall, and a plate connection loop in the form of a rigid structure between said mounting plate and the anode connection of said tube, said loop having a thermally-conductive cross section not less than the area of connection to said anode; and tube bracing wall means between said front connection wall and said back mounting wall in said input circuit chamber, said tube bracing wall being of electrically insulating material and providing electrically insulated mechanical bracing structures to said tube at a point spaced away from said tube support wall.

7. A cavity amplifier structure which includes: a metal housing comprised of a body open at each side, and a pair of removable side panels, said body having a front connection wall and a back mounting wall; a tube support wall extending from said mounting wall to said connection wall, and dividing the interior of said housing into a circuit, a section and a tank circuit cavity shaped to resonate at a design frequency, said circuit section and said tank cavity being each accessible by removal of one of said side panels; a wall dividing said circuit section into a power filter chamber and an input circuit chamber; a tube having a coaxial structure including an external flange for mounting and tube connection, said tube being mounted in said tube support wall with its anode end projecting into said tank circuit cavity, and its cathode end projecting into said input circuit chamber; walls defining an annular cavity within said tube mounting wall encircling said tube at said external flange, said cavity walls being shaped to form an inductance loop between opposite sides of said mounting flange, said inductance loop forming a series circuit with capacitance at said mounting flange; an anode circuit structure extending from the anode end of said tube to said tube support wall in said tank circuit cavity, said anode circuit structure comprising a mounting plate in intimate thermal contact with said tube support wall over an area substantially greater than the mounting area of said flange, by means of which said tube is mounted in said mounting wall, and a plate connection loop in the form of a rigid structure between said mounting plate and the anode connection of said tube, said loop having a thermally-conductive cross section not less than the area of connection to said anode; and ferrite core means in said annular cavity for increasing the inductance of the loop provided thereby.

References Cited in the file of this patent

UNITED STATES PATENTS

| | | |
|---|---|---|
| 2,642,533 | Priest | June 16, 1953 |
| 2,994,042 | Power et al. | July 25, 1961 |
| 3,048,802 | Jorcy | Aug. 7, 1962 |